No. 837,943. PATENTED DEC. 11, 1906.
A. O. MITCHELL.
BRAKE MECHANISM.
APPLICATION FILED JULY 6, 1906.
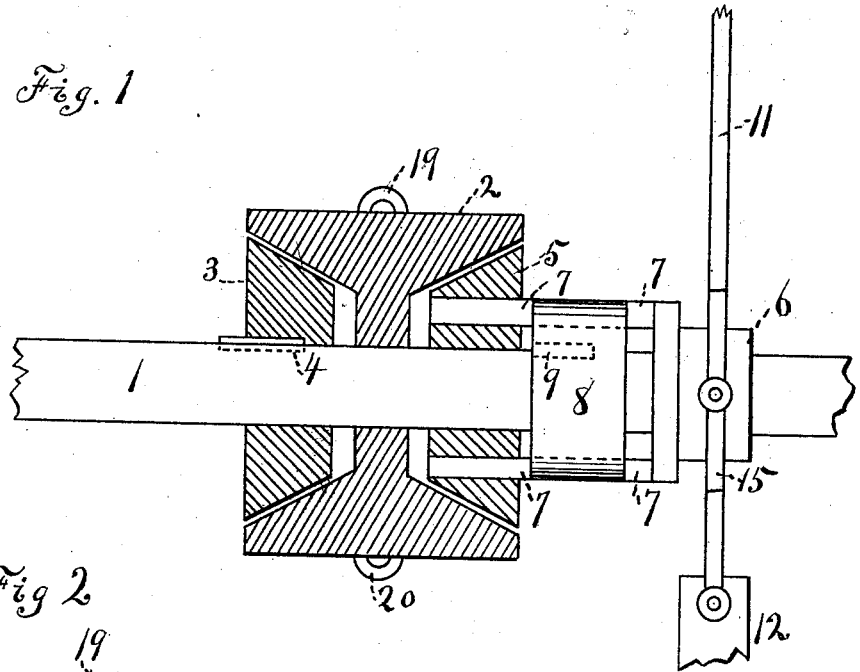
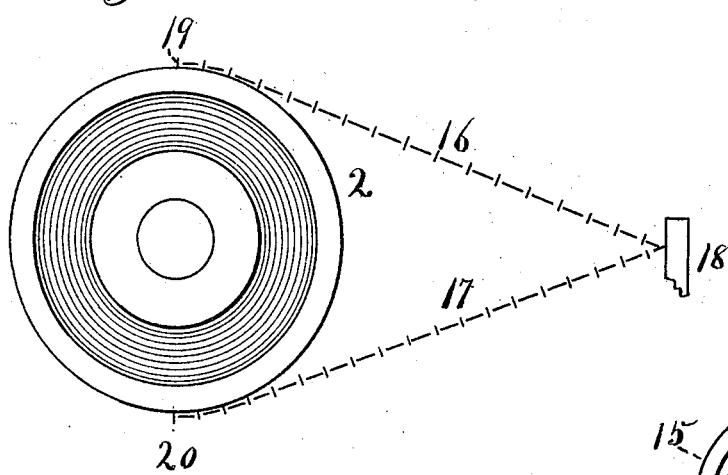
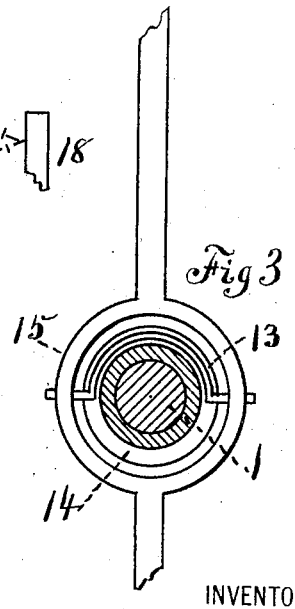
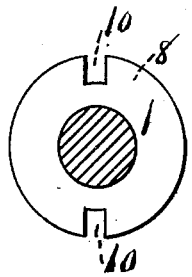
WITNESSES:
INVENTOR
A. O. Mitchell
BY
Edward P. Thompson
ATTORNEY

UNITED STATES PATENT OFFICE.

ALBERT O. MITCHELL, OF BETHLEHEM, CONNECTICUT.

BRAKE MECHANISM.

No. 837,943.  Specification of Letters Patent.  Patented Dec. 11, 1906.

Application filed July 6, 1906. Serial No. 324,934.

*To all whom it may concern:*

Be it known that I, ALBERT O. MITCHELL, a citizen of the United States of America, and a resident of Bethlehem, in the county of Litchfield and State of Connecticut, have invented certain new and useful Improvements in Brake Mechanism, of which the following is a specification.

My invention relates to that class of brake in which the momentum of the moving vehicle furnishes the main energy for maintaining the brake applied after once being applied by hand or other small force. When hand-power or similar force is employed for applying the brake, the hand-power must continue to act until the brake is released, but the momentum of the car also furnishes power for stopping the car. In general a loose pulley on the axle winds up the brake-chain when a friction-plug (fixed on the shaft, not directly, but through the medium of other elements) is forced against the loose pulley or idler.

The whole construction is illustrated in the accompanying drawings.

Figure 1 is a central section, although some of the parts are not in section. Some parts are broken away. Fig. 2 is a side view of the loose chain-pulley and a diagram of the chain. Fig. 3 shows the construction for connecting the operating-handle to a loose collar on the shaft. Fig. 4 is a view of a fixed collar above mentioned by itself and seen at right angles to its position in Fig. 1.

The organization shown consists of the axle 1, a loose double hollow-cone chain pulley or idler 2 on said shaft, a conical shoulder 3 on the left of said idler 2 and fixed by a key 4 to said shaft and fitting loosely within said idler and against which said idler 3 is adapted to be moved so that conical surfaces only touch; a conical friction-plug 5, fitting loosely in the hollow conical recess on that side of the idler which is opposite the shoulder 3 and itself loose on the shaft or axle 1; a loose collar 6 on the axle 1 and fixed to pins 7, which are fixed to and extend from the friction-plug 5, and a fixed collar 8, fastened on the axle 1 by a key 9 and having slots 10, in which fit the pins 7, respectively.

A handle 11 is pivoted to a support 12 and carries an arc-shaped band 13, which fits loosely in the circular slot 14 in the loose collar 6. The handle 11 has a ring 15 for spanning the collar 6. The band 13 extends from one side of this ring to the other and within the same and is journaled at its ends in the material of said ring. Chains 16 and 17 reach from the brake-bar 18 to diametrical points on the chain-pulley 2 and are fastened to the respective staples 19 and 20.

The action is as follows: When the axle is to be reduced in speed or stopped, the handle 11 is pulled to the left. The band thereby moves the collar 6 also to the left, and with it the pins 7 and friction-plug 5 also move to the left and push the idler 2 against the conical shoulder 3. Consequently the idler 2 becomes gripped or clutched between the plug 5 and the shoulder 3. The plug 5, though loose on the axle 1 and slidable along the axle, is forcibly rotated with the axle 1 as one piece therewith because of the pins 7 fitting in the slots 10 in the collar 8, which is fixed to the axle 1. The idler 2 now rotates also either with the same speed as that of the axle 1 or with a slower speed in virtue of the sliding of the idler 2 on the conical shoulder 3 and the conical plug 5. The rotation of said idler winds up the chain 16 or 17, as the case may be, and applies the brake efficiently. Two chains make the brake always ready for action. If only one chain were used, the idler might have to be turned through quite an angle before the brake would act.

I claim as my invention—

The combination of an axle, an idler thereon, brake-chains attached to diametrically opposite points on said idler, for actuating the brake, when said idler is turned forcibly, said idler having a conical recess on each side thereof, a shoulder fixed to said axle, and having a conical surface fitting loosely against the conical surface of said recess, a conical friction-plug fitting in the other recess loosely, a collar loose on said axle, pins fastening said collar and said plug together, a collar fixed on said axle and having slots in which fit said pins, said loose collar having a circular slot, a handle pivoted to turn back and forth, and a band carried by said handle and loosely fitting in said circular slot.

In testimony whereof I have hereunto subscribed my name this 3d day of July, 1906.

ALBERT O. MITCHELL. [L. S.]

Witnesses:
GEORGE A. SUMMERS,
HUGH L. BOYLE.